United States Patent
Markow et al.

(10) Patent No.: US 10,988,020 B2
(45) Date of Patent: Apr. 27, 2021

(54) DRIVE TRAIN MODULE FOR A MOTOR VEHICLE WITH A CLUTCH WHICH COMPRISES A PRESSURE EQUALIZATION DEVICE

(71) Applicant: ZF FRIEDRICHSHAFEN AG, Friedrichshafen (DE)

(72) Inventors: Alexander Markow, Schweinfurt (DE); Gerald Viernekes, Hassfurt (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/638,262

(22) PCT Filed: Aug. 10, 2018

(86) PCT No.: PCT/EP2018/071737
§ 371 (c)(1),
(2) Date: Feb. 11, 2020

(87) PCT Pub. No.: WO2019/034551
PCT Pub. Date: Feb. 21, 2019

(65) Prior Publication Data
US 2020/0171939 A1    Jun. 4, 2020

(30) Foreign Application Priority Data
Aug. 14, 2017    (DE) .................. 10 2017 214 127.1

(51) Int. Cl.
*F16D 48/02*    (2006.01)
*B60K 17/02*    (2006.01)
(Continued)

(52) U.S. Cl.
CPC .............. *B60K 17/02* (2013.01); *B60K 6/387* (2013.01); *B60K 6/40* (2013.01); *F16D 25/14* (2013.01)

(58) Field of Classification Search
CPC .......... B60K 17/02; B60K 6/387; B60K 6/40; B60K 6/48; B60K 2006/4825;
(Continued)

(56) References Cited

U.S. PATENT DOCUMENTS 9,625,030 B2 * 4/2017 Shimada ............... F16H 57/027
2004/0077449 A1 * 4/2004 Biermann ............... F16D 25/14
475/116
2018/0335096 A1 * 11/2018 Kim ....................... F16D 48/02

FOREIGN PATENT DOCUMENTS

DE    102014220835    4/2016
DE    102015217582    4/2016
(Continued)

*Primary Examiner* — David J Hlavka
(74) *Attorney, Agent, or Firm* — Cozen O'Connor

(57) ABSTRACT

A drivetrain module for a motor vehicle having a clutch with an input area and an output area. A mutual rotational driving of the input area and output area is influenceable by the action of the clutch. The clutch has a clutch housing with a clutch space formed therein. The input area and the output area are arranged at least partially in the clutch space. The clutch space is filled and is closed to be tight against fluid relative to a surrounding area of the clutch space. The clutch has a pressure compensation device for compensation of a pressure difference acting between the clutch space and the surrounding area.

6 Claims, 1 Drawing Sheet

(51) Int. Cl.
  *B60K 6/387* (2007.10)
  *B60K 6/40* (2007.10)
(58) Field of Classification Search
  CPC ...... F16D 25/14; F16D 27/14; F16D 2300/08; F16D 27/118; H02K 2205/09; H02K 7/1085; H02K 7/006
  See application file for complete search history.

(56) References Cited

FOREIGN PATENT DOCUMENTS

| | | |
|---|---|---|
| DE | 102015224664 | 6/2017 |
| EP | 1150029 | 10/2001 |

\* cited by examiner

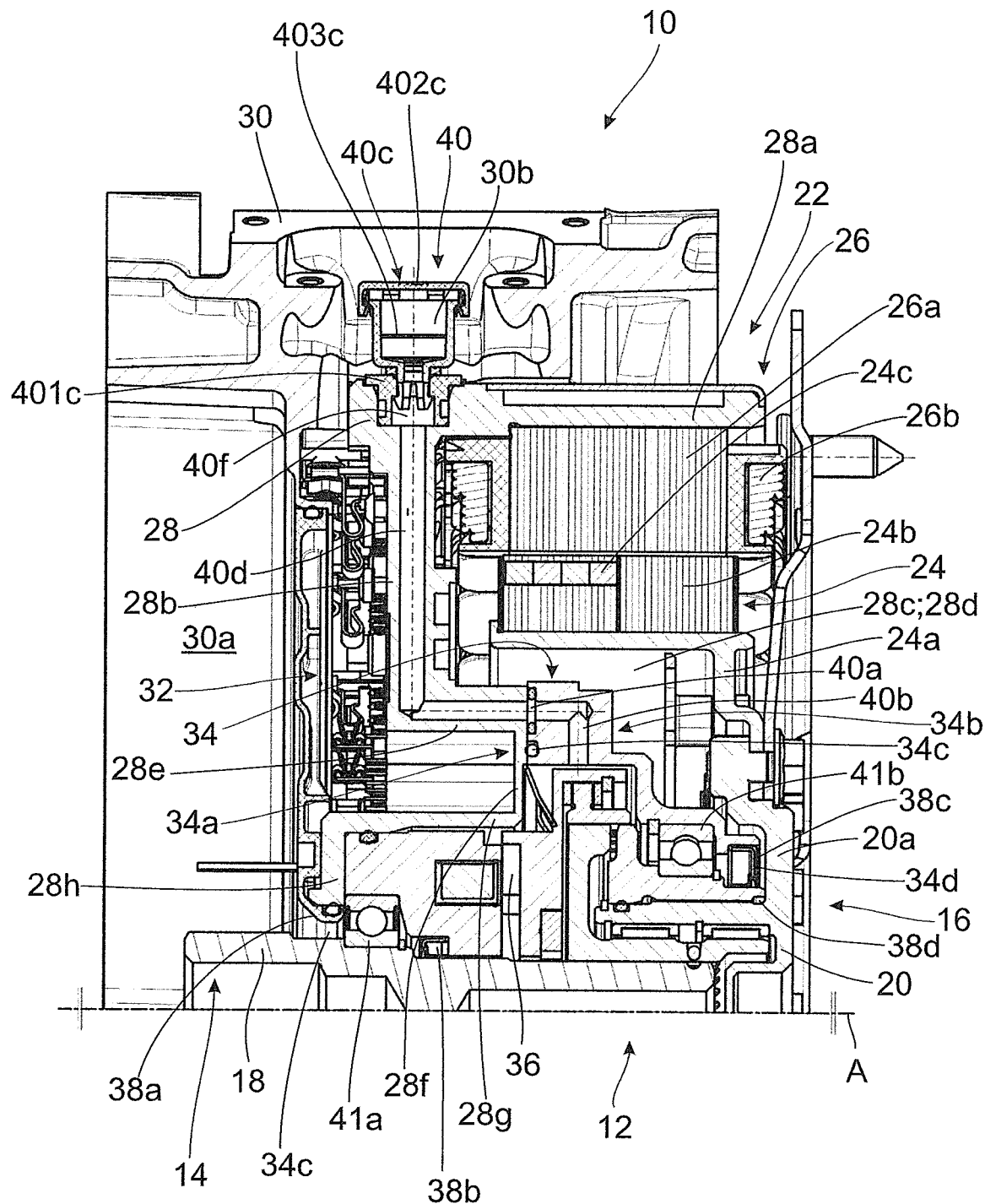

DRIVE TRAIN MODULE FOR A MOTOR VEHICLE WITH A CLUTCH WHICH COMPRISES A PRESSURE EQUALIZATION DEVICE

CROSS REFERENCE TO RELATED APPLICATIONS

This is a U.S. national stage of Application No. PCT/EP2018/071737 filed Aug. 10, 2018. Priority is claimed on German Application No. DE 10 2017 214 127.1 filed Aug. 14, 2017 the content of which is incorporated herein by reference.

BACKGROUND OF THE INVENTION

1. Field of the Invention

The invention is directed to a drivetrain module for a motor vehicle.

2. Description of Related Art

A drivetrain module is already known, for example, from DE 10 2014 220 835 A1 that comprises a clutch with an input area and with an output area. A mutual rotational driving of the input area and output area can be influenced by the action of the clutch. The clutch has a clutch housing with a clutch space formed therein. The input area and output area are arranged at least partially in the clutch space. The clutch space is at least partially filled with a fluid or with a paste and is closed so as to be substantially tight against fluid relative to a surrounding area of the clutch space.

A vehicle with a drivetrain module of this type is subject to comparatively large temperature fluctuations in the range of about 150K due to external influences and driving operation, which can lead to correspondingly large pressure differences between the clutch space located inside of the clutch housing and the surrounding area of the clutch housing due to the substantially fluid-tight housing. By way of the fluid or paste located in the clutch space, these pressure differences exert a pressure on the sealing locations and bearing locations sealing the clutch housing. This can load the sealing elements beyond a prescribed extent so that when there is an increase in the internal pressure in the clutch space the fluid or paste can overcome the sealing elements and can then exit or, on the other hand, under negative pressure, air and dirt can enter the clutch space disadvantageously.

SUMMARY OF THE INVENTION

In view of the problem described above, one aspect of the invention has the object of providing a generic drivetrain module by which the above-mentioned disadvantages are prevented.

According to one aspect of the invention, the proposed drivetrain module is characterized in that the clutch has a pressure compensation device for compensation of a pressure difference acting between the clutch space and the area surrounding the latter. Accordingly, a pressure difference caused by temperature changes can be compensated from the outset so that the clutch space remains substantially pressureless and, therefore, no unwanted forces acting on the bearing points of the input area and output area located at the clutch housing are exerted via the fluid or paste located in the clutch space.

According to a first configuration of one aspect of the invention, a pressure compensation opening that can communicate with a pressure compensation valve is formed at the clutch housing for the purpose of pressure compensation. The pressure compensation opening is preferably provided at a geodetic top position of the clutch housing with respect to the installed position of the drivetrain module, particularly between a 10 o'clock position and a 2 o'clock position, preferably in the area of a 12 o'clock position. When the clutch space is not completely filled with fluid or with a paste, a geodetic top spatial region can act as gas collecting space that can communicate with the surrounding area via a pressure compensation opening located therein.

The pressure compensation valve can preferably have a semipermeable diaphragm that is permeable to air but not to fluid so as to enable a pressure compensation. Accordingly, when a pressure compensation is enabled, an escape or loss of fluid or of a paste located in the clutch space as well as unwanted entry of dirt particles or moisture are prevented.

In a further configuration, a module housing, which surrounds the clutch housing, can be provided at the drivetrain module, and the clutch housing and module housing are radially spaced apart from one another. The two housings can advantageously communicate with one another through a pressure compensation channel, and the pressure compensation valve is arranged at the module housing. The pressure compensation valve is preferably provided at a geodetic top position of the module housing with respect to the installed position of the drivetrain module, particularly between a 10 o'clock position and a 2 o'clock position, preferably in the area of a 12 o'clock position.

Further advantageously, the drivetrain module can have as a further component an electric machine with a stator and with a rotor. The rotor is connected to the input area or the output area of the clutch, and a system carrier constructed as module housing or connected to the module housing is provided, the stator and/or power electronics associated with the electric machine being arranged at the system carrier. The pressure compensation channel can advantageously be formed in the system carrier. When the system carrier is produced by casting, e.g., from an aluminum material, the pressure compensation channel can be formed directly during the casting process, possibly together with further channels, particularly with a cooling channel and/or a pneumatic or fluidic actuation channel for actuating the clutch.

According to a further advantageous configuration, at least a portion of the clutch housing can be formed by the system carrier. It has proven advantageous to axially divide the clutch housing so that a further portion of the clutch housing is formed by half-shell.

BRIEF DESCRIPTION OF THE DRAWINGS

The FIGURE is an axial section through a diversion module.

DETAILED DESCRIPTION OF THE PRESENTLY PREFERRED EMBODIMENTS

The invention will now be described by way of example referring to the accompanying drawing.

The FIGURE shows an axial section through a drivetrain module 10 for a motor vehicle. The drivetrain module 10 has, as a first functional component, a clutch 12 with an input area 14 and with an output area 16. The clutch 12 is formed as a disconnect clutch so that the input area 14 and the output area 16 can be brought into torque transmitting engagement with one another or disconnected from one another, i.e. uncoupled, by actuating the clutch 12. In the present instance, the input area 14 comprises a first shaft 18, and the output area 16 comprises a second shaft 20 arranged coaxial thereto relative to an axis A.

The drivetrain module 10 further comprises, as a second functional component, an inrunner-type electric machine 22 with a rotor 24 bearing-mounted so as to be rotatable around axis A and supported by a rotor support 24a connected with the output area 16 of the clutch 12, particularly with a radial flange 20a of the second shaft 20, so as to be fixed with respect to rotation relative to it. Electromagnetic rotor components in the form of a lamination stack 24b with permanent magnets 24c are arranged on the rotor support 24a.

A stator 26 having an electromagnetic stator component in the form of a lamination stack 26a with coils 26b arranged at the latter is arranged radially outwardly of the rotor 24. The stator lamination stack 26a is supported by a stator support 28a which radially outwardly surrounds the lamination stack 26a and formed as stator support portion 28a of a system carrier 28. The system carrier 28 is inserted and secured in a receiving space 30a of a module housing 30 of the drivetrain module 10.

As is further shown in the FIGURE, the system carrier 28 has, in addition to the stator support portion 28a, a radial wall portion 28b formed integral therewith. Accordingly, the system carrier 28 forms a pot-like receiving space 28c in which the electric machine 22 is at least partially received. A circular disk-shaped or at least circle segment-shaped power electronics unit 32, particularly a power board, i.e., an inverter for controlling the electric machine 22, is arranged on the axial side of the radial wall portion 28b opposite the electric machine 22 and formed around rotational axis A. The power electronics 32 are in thermal contact with the system carrier 28 and, in particular, with a fluid cooling arrangement formed at the radial wall portion 28b. The cooling channel of the fluid cooling arrangement is situated outside of the section plane shown in the FIGURE and is therefore not visible in the drawing.

The FIGURE further shows that a pot-shaped receiving space 28d that receives the above-mentioned clutch 12 is formed radially inwardly of the electric machine 22, particularly inside of the rotor 24.

As is shown in the FIGURE, the clutch 12 can be formed as a positive clutch, particularly as a dog clutch, which can be actuated electromagnetically. The elements and manner of operation of the clutch 12 are described in detail, for example, in DE 10 2015 224 664 A1, the entirety of which disclosure is incorporated by reference in the present application. The clutch 12 is functionally operative as disconnect clutch between an internal combustion engine, not shown, and the electric machine 22 and can introduce a driving torque of the internal combustion engine into a manual transmission, also not shown, in the engaged state. A torque can also be transmitted from the electric machine 22 to the internal combustion engine for starting the internal combustion engine when the clutch 12 is engaged.

As pertains to the present invention, regardless of functionality, clutch type or clutch construction, it is particularly important that the clutch 12 has a closed clutch housing 34 with a clutch space 36 formed therein.

In the above-mentioned embodiment example, the clutch housing 34 is formed by two housing shells 34a, b connected to one another. The first housing shell 34a is formed by a pot-shaped area of the system carrier 28 radially inwardly adjoining the radial wall portion 28b. Additionally adjoining the radial wall portion 28b in the cross section shown in the drawing are an axial portion 28e extending in direction of the stator support portion 28a, further a portion 28f leading radially inward, then an axially offset portion 28g and, lastly, a further portion 28h facing radially inward.

The second housing shell 34b is formed by a dome-shaped element, which is stepped down in diameter multiple times. Central recesses 34c, b are formed at the two housing shells 34a, b for insertion of the input area 14 and the output area 16 of the clutch 12. Sealing arrangements 38a-d and bearing arrangements 41a, b of the shafts 18, 20 are also located in the area of the central recesses 34c, d. The two housing shells 34a, b are fixedly joined together by their radially outer areas by a sealing element 34e.

Shafts 18, 20 of input area 14 and output area 16 engage in the clutch space 36 formed in this way so that they are located at least partially inside and partially outside of the clutch space 36. Further, the clutch space 36 is at least partially filled with a lubricant or coolant and is closed to be substantially fluid-tight relative to a surrounding area of the clutch housing 34 by the above-mentioned sealing arrangements 38a-d. Accordingly, it is not compulsory that the electric machine 22 is arranged in a wet space; it can also be operated in a dry space.

The drivetrain module 10 with the electric machine 22 and the clutch 12 is subject to comparatively large temperature fluctuations in the range of about 150K, which can lead to correspondingly large pressure differences between the clutch space 36 located inside of the clutch housing 34 and the surrounding area of the clutch housing 34 due to the substantially fluid-tight clutch housing 34. By way of the fluid or paste located in the clutch space 36, these pressure differences exert a pressure on the sealing locations and bearing locations 38, 41 sealing the clutch housing 34. This can load the sealing elements located therein beyond a prescribed degree so that when there is an increase in the internal pressure in the clutch space 36 the fluid or paste can overcome the sealing elements and can then exit or, on the other hand, under negative pressure, air and dirt can enter the clutch space disadvantageously.

Therefore, to remedy this problem a pressure compensation device 40 is provided in the drivetrain module 10 to compensate a pressure difference between the clutch space 36 and the surrounding area thereof. To this end, a channel 40b, which can communicate with a pressure compensation valve 40c proceeding from the clutch space 36 and leading to a pressure compensation opening 40a, is formed at the clutch housing 34, particularly at the second housing shell 34b. The pressure compensation opening 40a in the present instance, as is shown in the drawing, is provided at the geodetic top position of the clutch housing 34 with respect to the installed position of the drivetrain module 10, i.e., in the area of the 12 o'clock position. As can further be seen, the clutch housing 34 and the module housing 30 are spaced apart radially and are connected to one another through a pressure compensation channel 40d provided at the module housing 30. This pressure compensation channel 40d proceeds from the pressure compensation opening 40a of the clutch housing 34 and then runs in the system carrier 28 initially axially within the pot-shaped area 28e and then radially outward at the radial wall portion 28b. The pressure compensation channel 40d has at the radially outer edge area an orifice 40f that is widened in diameter and into which a snap-in holding element 401c of the pressure compensation valve 40c is inserted. An opening 30b is provided at the same circumferential position in the module housing 30. A further element 402c of the pressure compensation valve with a semipermeable diaphragm 403c is inserted into opening 30b and snapped in and locked with the holding element 401c. The pressure compensation valve 40c is permeable to air through a diaphragm such as this but is not permeable to fluid. The pressure compensation channel 40d proceeding from the clutch space 36 accordingly leads to the outer wall of the module housing 30.

The pressure compensation valve 40c is provided at a geodetic top position of the module housing 30, particularly in the area of a 12 o'clock position, with respect to the installed position of the drivetrain module 10.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A drivetrain module for a motor vehicle, comprising:
   a clutch with an input area and with an output area, a mutual rotational driving of the input area and output area is influenceable by an action of the clutch, the clutch comprises:
      a clutch housing with a clutch space formed therein that is closed so as to be substantially tight against fluid relative to a surrounding area of the clutch space;
      wherein the input area and the output area are at least partially arranged in the clutch space, wherein the clutch space is at least partially filled with a fluid or with a paste; and
   a pressure compensation device configured to compensate a pressure difference acting between the clutch space and the surrounding area thereof.

2. The drivetrain module according to claim 1, wherein the pressure compensation device has a pressure compensation opening formed at the clutch housing and is configured to communicate with a pressure compensation valve.

3. The drivetrain module according to claim 2, wherein the pressure compensation valve comprises a semipermeable diaphragm that is permeable to air but not to fluid so as to enable a pressure compensation.

4. The drivetrain module according to claim 3, further comprising:
   a module housing which surrounds the clutch housing, wherein the clutch housing and the module housing are radially spaced apart from one another; and
   a pressure compensation channel that connects the clutch housing and the module housing;
   wherein the pressure compensation valve is arranged at the module housing.

5. The drivetrain module according to claim 4, wherein the drivetrain module further comprises:
   an electric machine with a stator and a rotor;
   wherein the rotor is connected to the input area or to the output area;
   wherein a system carrier constructed as the module housing or connected to the module housing is provided;
   wherein the stator and/or power electronics associated with the electric machine are arranged at the system carrier, and
   wherein the pressure compensation channel is formed in the system carrier.

6. The drivetrain module according to claim 5, wherein at least a portion of the clutch housing is formed by the system carrier.

* * * * *